US 7,289,626 B2

(12) United States Patent
Carter et al.

(10) Patent No.: US 7,289,626 B2
(45) Date of Patent: Oct. 30, 2007

(54) ENHANCEMENT OF SOUND QUALITY FOR COMPUTER TELEPHONY SYSTEMS

(75) Inventors: George E. Carter, Santa Clara, CA (US); Bianka Skubnik, Mountain View, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1046 days.

(21) Appl. No.: 09/850,040

(22) Filed: May 7, 2001

(65) Prior Publication Data

US 2002/0164013 A1    Nov. 7, 2002

(51) Int. Cl.
*H04M 1/00* (2006.01)
*H04M 9/00* (2006.01)
(52) U.S. Cl. ............... 379/387.02; 381/94.3
(58) Field of Classification Search ........... 379/387.02, 379/387.01; 381/94.3; 704/226, 227, 233
See application file for complete search history.

(56) References Cited

U.S. PATENT DOCUMENTS

| | | | | |
|---|---|---|---|---|
| 4,185,168 | A * | 1/1980 | Graupe et al. | 381/318 |
| 4,255,620 | A * | 3/1981 | Harris et al. | |
| 4,642,583 | A | 2/1987 | Fucito et al. | 333/14 |
| 4,820,059 | A * | 4/1989 | Miller et al. | |
| 4,847,897 | A | 7/1989 | Means | 379/390 |
| 4,985,925 | A | 1/1991 | Langberg et al. | 381/72 |
| 5,091,954 | A | 2/1992 | Sasaki et al. | 381/72 |
| 5,265,042 | A | 11/1993 | Smith, Jr. | |
| 5,343,523 | A | 8/1994 | Bartlett et al. | 379/430 |
| 5,577,161 | A * | 11/1996 | Pelaez Ferrigno | 704/226 |
| 5,664,052 | A * | 9/1997 | Nishiguchi et al. | 704/214 |
| 5,677,987 | A * | 10/1997 | Seki et al. | 381/71 |
| 5,751,822 | A | 5/1998 | Yamaguchi et al. | 381/94.1 |
| 5,752,225 | A * | 5/1998 | Fielder | |
| 5,774,565 | A | 6/1998 | Benning et al. | 381/83 |
| 5,933,495 | A | 8/1999 | Oh | 379/420 |
| 6,205,421 | B1 * | 3/2001 | Morii | 704/226 |
| 6,289,309 | B1 * | 9/2001 | deVries | 704/233 |
| 6,321,194 | B1 * | 11/2001 | Berestesky | |
| 6,445,801 | B1 * | 9/2002 | Pastor et al. | 381/94.2 |
| 6,480,823 | B1 * | 11/2002 | Zhao et al. | |
| 6,658,107 | B1 * | 12/2003 | Sorqvist et al. | 379/406.05 |
| 6,711,540 | B1 * | 3/2004 | Bartkowiak | 704/226 |
| 2002/0118851 | A1 * | 8/2002 | Paludan-Mueller | 381/317 |

FOREIGN PATENT DOCUMENTS

| WO | WO 00/38180 | 6/2000 |
|---|---|---|
| WO | WO 00/62501 | 10/2000 |

\* cited by examiner

*Primary Examiner*—Ramnandan Singh

(57) ABSTRACT

Techniques for enhancing the sound quality of computer telephony systems are provided. In general, digital signals including telephony sounds are converted from the time domain to the frequency domain. If noise is detected in the frequency domain conversion of the digital signals, the noise is removed utilizing a filter. The noise detection and filtering can be performed in software so that enhanced audio quality can be achieved at a relatively low cost and with flexibility for very diverse environments.

26 Claims, 12 Drawing Sheets

ENHANCEMENT OF SOUND QUALITY FOR COMPUTER TELEPHONY SYSTEMS

BACKGROUND OF THE INVENTION

The present invention relates to computer telephony systems. More specifically, the invention relates to enhancing the sound quality of computer telephony systems by removing noise.

Conventional telephones operate using circuit-switched technology. The circuit-switched telephone backbone is composed of dedicated copper wires or fiber optic cables that are typically owned by the telephone companies. In general, the telephone companies charge fees for telephone calls based on the duration of the call and the distance between the caller and receiver, which is designed to cover the costs for installing, expanding and maintaining the telephone backbone.

With packet-switched telephone systems, a speaker's voice (or other data) is broken down and sent over a computer network as multiple packets. Computer telephony can offer significant cost savings because dedicated network connections are replaced by network connections shared among many users, which results in much more efficient use of bandwidth and reduced wiring costs. Additionally, in theory, computer telephony can offer easier administration.

One of the main problems inhibiting the widespread adoption of computer telephony systems is that audio quality levels are generally below those of conventional telephony. For example, a persistent complaint has been that computer telephony has relatively high levels of background noise. Currently, the problem of background noise in computer telephony systems has not been satisfactorily resolved.

A traditional engineering solution to background noise is to use a noise gate. Noise gates have been effective in suppressing background noise in high-end public address systems, in multiple microphone and radio broadcasting, and in hearing aids, which are technology areas that generally command high prices and margins. Since noise gates would be required in every client, the high cost associated with noise gates is a major disadvantage of using them in computer telephony, which may require a vastly lower cost structure (e.g., prices and margins may need to be low to compete with conventional telephony).

Another disadvantage of using noise gates in computer telephony is that a noise gate is typically a single output device, meaning that the noise gate gates a single audio stream. Also, noise gates have thus far been inapplicable for computer telephony due to high costs associated with hardware and hybrid hardware-software solutions. In computer telephony, there are typically three audio streams that need to be noise gated at every client, two maintones and the sidetone, each with potentially different processing requirements. Thus, using so many traditional noise gates would be expensive. A low cost way to noise gate three audio streams with different requirements is desirable.

There are many different kinds of noise scenarios that can be present in computer telephony systems. As examples, noise can be present at virtually all frequencies, noise can be present at low frequencies, noise can be present at high frequencies, noise can be present at power line frequencies and harmonics thereof, and any combination of these. The noise is typically caused by the computer telephony environment which includes the computer telephony hardware and network.

Currently, the solution to many of these noise problems is to install hardware filters to client sound cards and possibly to install additional hardware filters within the gateway. A major disadvantage of this solution is that it is expensive, both in terms of equipment costs and personnel time. Furthermore, the hardware filters are generally always left on, which can result in a degradation of fidelity in non-telephony audio applications. Adding hardware to automatically activate the hardware filters will likely increase the cost even more. Moreover, the hardware filters may not be sufficiently flexible as they may be only designed to filter out a specific type of noise.

It would be beneficial to have innovative techniques for enhancing the sound quality of computer telephony systems by removing noise. Additionally, it would be beneficial if the techniques are low cost and flexible within the computer telephony environment.

SUMMARY OF THE INVENTION

The present invention provides innovative techniques for enhancing the sound quality of computer telephony systems. In general, digital signals including telephony sounds are converted from the time domain to the frequency domain. If noise is detected in the frequency domain conversion of the digital signals, the noise is removed utilizing a filter. The noise detection and filtering are preferably performed in software, which can provide the advantages that the enhanced audio quality comes at a relatively inexpensive cost and can be flexible for very diverse environments. Some embodiments of the invention are described below.

In one embodiment, the invention provides a computer implemented method of enhancing sound quality for computer telephony systems. Digital signals including telephony sounds are received and time-to-frequency domain conversion on the digital signals is performed. It is then determined whether noise is present in the frequency domain conversion of the digital signals. If noise was detected in the frequency domain conversion in the digital signals, a filter is applied to remove the noise. In preferred embodiments, the filter is a software filter.

In another embodiment, the invention provides a computer implemented method of enhancing sound quality for computer telephony systems. Digital signals including telephony sounds are received and time-to-frequency domain conversion on the digital signals is performed. It is then determined whether noise is present in the frequency domain conversion of the digital signals if the amplitudes of sounds in first and second bands in the frequency domain conversion of the digital signals are substantially the same. If noise was detected in the frequency domain conversion of the digital signals, a filter is applied to remove the noise.

In another embodiment, the invention provides a computer implemented method of enhancing sound quality for computer telephony systems. Digital signals including telephony sounds are received and time-to-frequency domain conversion on the digital signals is performed. It is then determined whether noise is present in the frequency domain conversion of the digital signals if the amplitudes of sounds in a middle band do not exceed the amplitudes of sounds in low and high bands by a predetermined amount. If noise was detected in the frequency domain conversion of the digital signals, a filter is applied to remove the noise. In one embodiment, the low band includes sounds with frequencies less than 500 Hertz, the middle band includes sounds with frequencies from 500 to 1500 Hertz and the high band includes sounds with frequencies greater than 1500 Hertz. In another embodiment the amplitudes of sounds can be an average over a time interval.

In another embodiment, the present invention provides a computer implemented method of enhancing sound quality for computer telephony systems. Digital signals including telephony sounds are received and time-to-frequency domain conversion on the digital signals is performed. It is then determined whether noise is present in the frequency domain conversion of the digital signals if the amplitudes of sounds at one or more power line frequencies in the frequency domain conversion of the digital signals cross a threshold over a time interval. If noise was detected in the frequency domain conversion of the digital signals, a filter is applied to remove the noise. The one or more power line frequencies and their harmonics can include one or more of 50 Hertz, 60 Hertz, 100 Hertz, 120 Hertz, 150 Hertz, and 180 Hertz.

In another embodiment, the invention provides a computer implemented method of enhancing sound quality for computer telephony systems. Digital signals including telephony sounds are received and time-to-frequency domain conversion on the digital signals is performed. It is then determined whether noise is present in the frequency domain conversion of the digital signals if the amplitudes of sounds in a first band in the frequency domain conversion of the digital signals crosses a threshold over a time interval. If noise was detected in the frequency domain conversion of the digital signals, a filter is applied to remove the noise. Typically, the filter includes a low pass or high pass filter.

Other features and advantages of the invention will become readily apparent upon the review of the following description in association with the accompanying drawings. In the drawings, the same or similar structures will be identified by the same reference numerals.

DETAILED DESCRIPTION OF EMBODIMENTS

In the description that follows, the present invention will be described in reference to embodiments that enhance the audio quality of computer telephony systems by removing unwanted noise. More specifically, the embodiments will be described in reference to preferred embodiments that utilize software to both detect and filter the noise. However, the invention is not limited to the specific implementations, applications, or architectures described herein as the invention can be implemented in different ways. Therefore, the description of the embodiments that follows is for purposes of illustration and not necessarily limitation.

Figure 1:
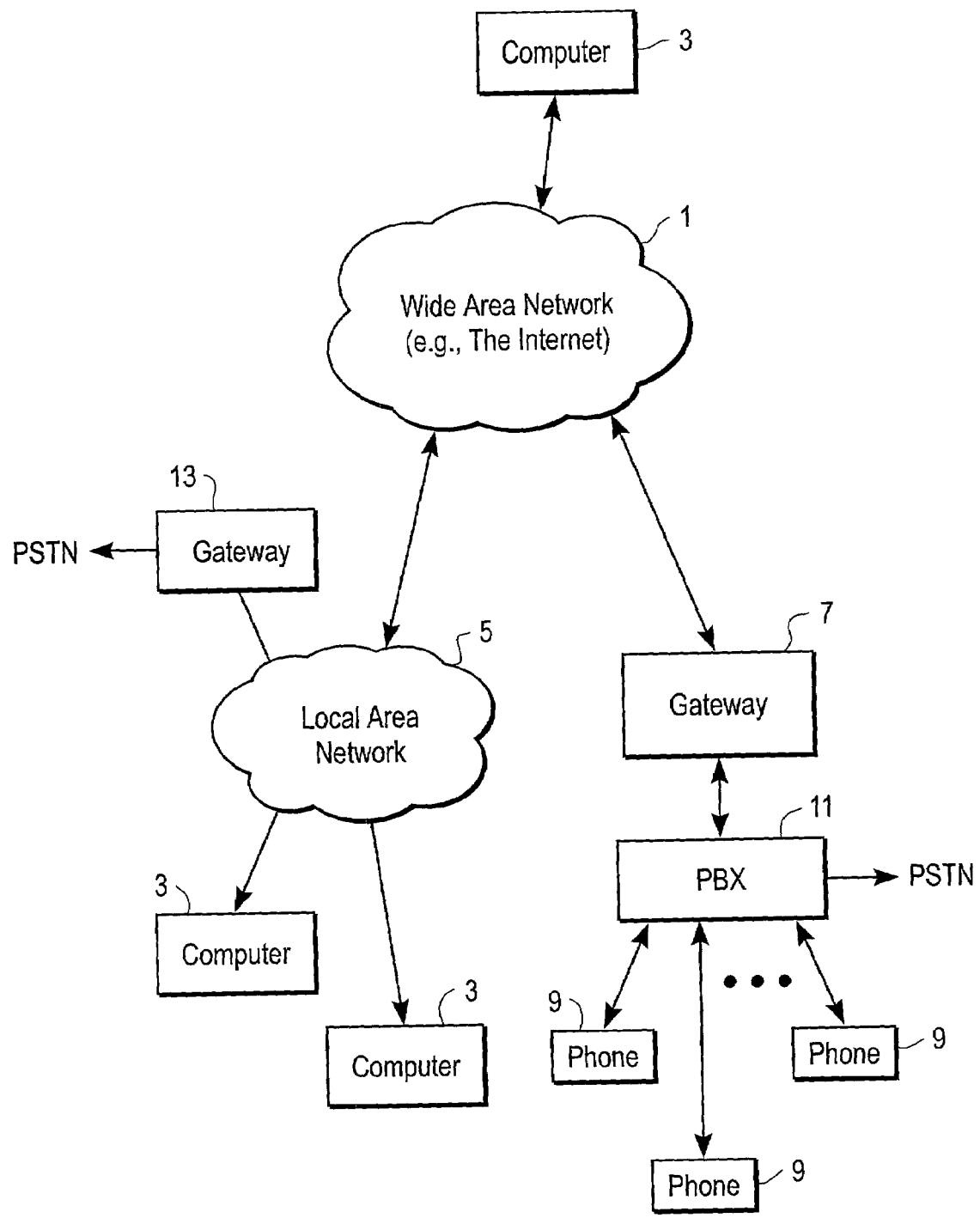
FIG. 1 shows a block diagram of a computer telephony system including a wide area network, local area network and gateway.

FIG. 1 illustrates a computer telephony network including multiple computer telephony systems and gateways. A wide area network (WAN) 1 transmits digital signals, typically in the form of packets, that include telephony sounds among the computer telephony systems. Although other wide area networks can be utilized, an exemplary wide area network is the Internet. As will be discussed below, various specific embodiments of the present invention may be used in computer telephony clients and/or in gateways.

A computer system 3 is shown in communication with WAN 1 in order to, among other things, send and receive digital signals including telephony sounds. The computer system can be connected to the wide area network in many different ways including low bandwidth connections (e.g., modems) and high bandwidth connections (e.g., T1 or E1). Computer systems 3 are also called computer telephony clients.

A local area network (LAN) 5 is shown in communication with WAN 1. As a typical example, LAN 5 can represent the network of a specific company. Computer systems 3 are in communication with LAN 5 to, among other things, send and receive digital signals including telephony sounds. In addition, a gateway 13 connected to LAN 5 and also to the PSTN can be part of a telephony-over-LAN system, parts of which can utilize specific embodiments of the present invention.

Another type of a gateway 7 is shown in communication with WAN 1 to send and receive digital signals including telephony sounds. Gateway 7 is a hardware box that is typically connected between a network and multiple phones 9 through a private branch exchange (PBX) 11 which is trunked to the public switched telephone network (PSTN). Typically, gateway 7 receives digital signals including telephony sounds from a network, converts the digital signals into analog or digital signals (of a different type) and these signals are routed to the appropriate analog or digital phone 9 by PBX 11. Accordingly, gateways allow computer telephony systems to interwork with traditional telephone systems, both analog and digital, and networks (PSTN). In other configurations, the gateway can be connected directly to the phones (and to the PSTN) or a PBX can be designed with an internal gateway.

Figure 2:
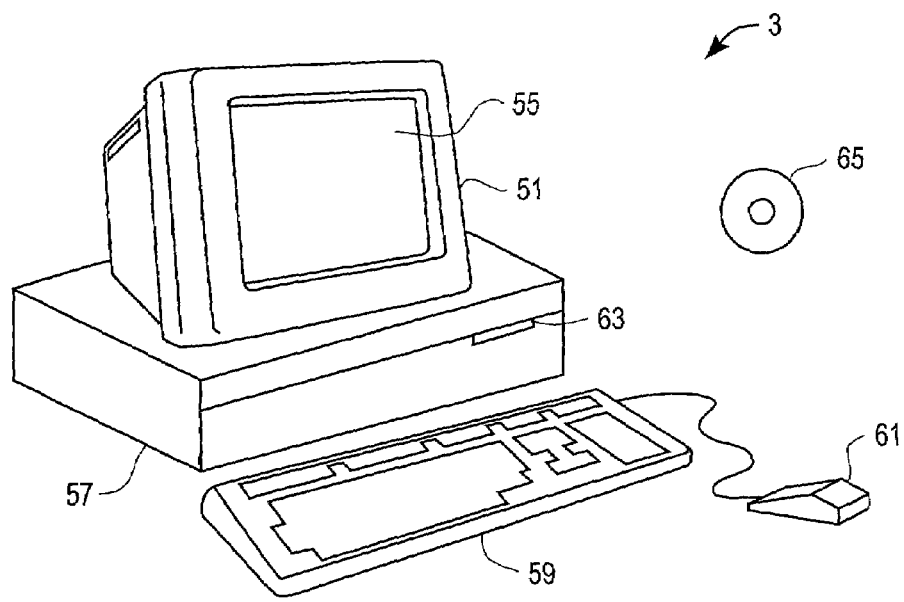
FIG. 2 illustrates an example of a computer system that can be utilized to execute software embodiments of the invention.

FIG. 2 illustrates an example of a computer system that can be used to execute software embodiments of the invention. FIG. 2 shows a computer system 3 that includes a display 51, screen 55, cabinet 57, keyboard 59, and mouse 61. Mouse 61 can have one or more buttons for interacting with a graphical user interface (GUI). Cabinet 57 houses a CD-ROM drive 63, system memory and a hard drive (see FIG. 3) which can be utilized to store and retrieve software programs incorporating computer code that implements aspects of the invention, data for use with the invention, and the like. Although CD-ROM 65 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 3:
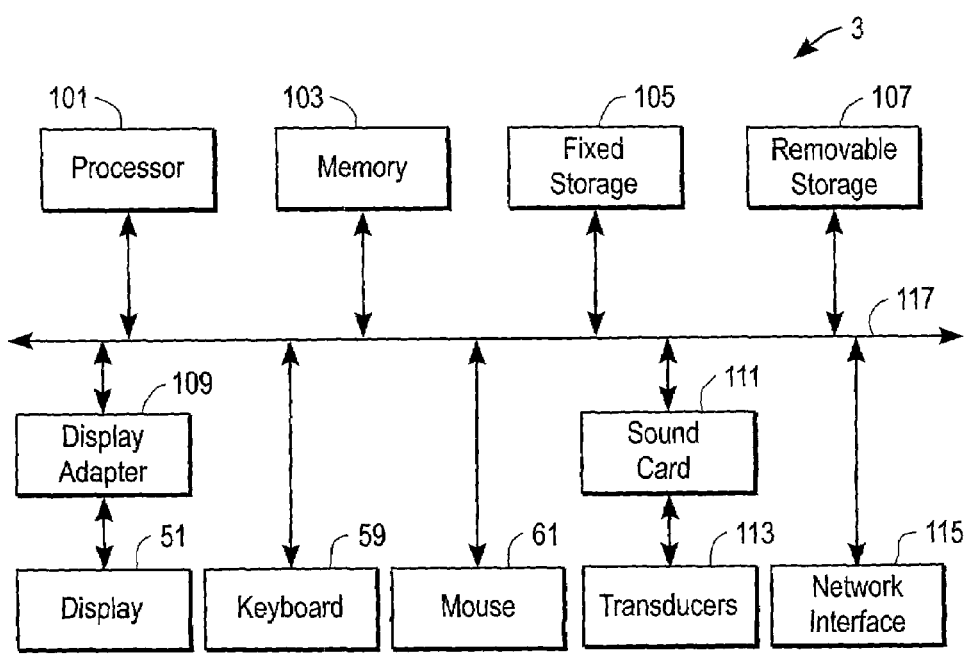
FIG. 3 illustrates a system block diagram of the computer system of FIG. 2

FIG. 3 shows a system block diagram of computer system 3 used to execute software of an embodiment of the invention or use hardware embodiments. As in FIG. 2, computer system 3 includes display 51, keyboard 59, and mouse 61. Computer system 3 further includes subsystems such as a central processor 101, system memory 103, fixed storage 105 (e.g., hard drive), removable storage 107 (e.g., CD-ROM drive), display adapter 109, sound card 111, transducers 113 (speakers, microphones, and the like), and network interface 115. The network interface may provide the communication to the computer telephony network. Other computer systems suitable for use with the invention can include additional or fewer subsystems. For example, another computer system could include more than one processor 101 (i.e., a multi-processor system) or a cache memory.

The system bus architecture of computer system 3 is represented by arrows 117. However, these arrows are illustrative of any interconnection scheme serving to link the subsystems. For example, a local bus could be utilized to connect the central processor to the system memory and/or display adapter. Computer system 3 shown in FIG. 3 is but an example of a computer system suitable for use with the invention. Other computer architectures having different configurations of subsystems can also be utilized.

Figure 4:
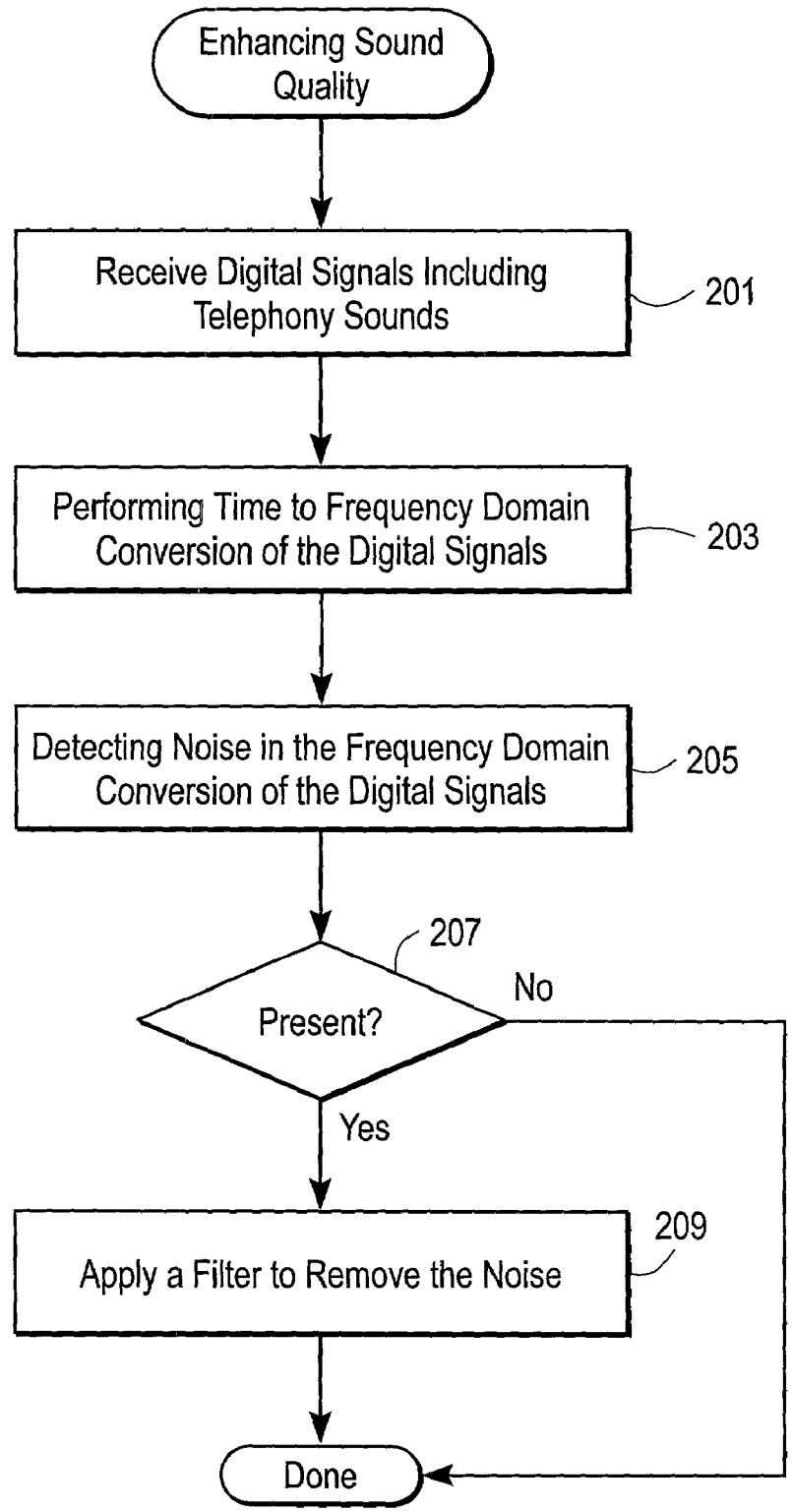
FIG. 4 shows a flowchart of a process of enhancing sound quality of computer telephony systems, according to some specific embodiments.

Now that some hardware environments have been described, it may be beneficial to describe the high level flow of one embodiment of the invention. FIG. 4 shows a flow chart of a process of enhancing sound quality by detecting and filtering out noise. Advantageously, the software-only nature of the present invention provides for low cost, flexible implementation and easy upgradability, as further additional algorithms for noise detection are developed. At a step 201, digital signals including telephony sounds are received. The digital signals are typically received from a network (e.g., a wide or local area network). The digital signals include the telephony sounds in the time domain and are typically sent in multiple packets.

At a step 203, time-to-frequency domain conversion is performed on the digital signals. By converting the digital signals to the frequency domain, the telephony sounds can be more effectively analyzed.

It is determined whether noise is present in the frequency domain conversion of the digital signals at a step 205. As will be described in more detail below, there are many techniques for detecting the presence of noise or voice. These techniques include determining whether the amplitudes of all sounds cross certain thresholds, determining whether the amplitudes of sounds in first and second bands are substantially the same, determining whether the amplitudes of sounds in a middle band are higher than low and high bands, determining whether the amplitudes of sounds at one or more power line frequencies cross a certain threshold, and determining whether the amplitudes of sounds in a first band cross a certain threshold. These techniques for detecting for either noise or voice are described below and the invention can be advantageously utilized with other techniques of detecting noise.

If it is determined at a step 207 that noise is present in the frequency domain conversion of the digital signals, a filter is applied to remove the noise at a step 209. Typically, the filter that is used to remove the noise is dependent upon the type of noise detected. Further details on filters that can be utilized to remove detected noise will be described in more detail below. As with all the flow charts shown herein, steps can be added, deleted, combined, modified, and reordered without departing from the spirit of the scope of the invention.

Figure 5:
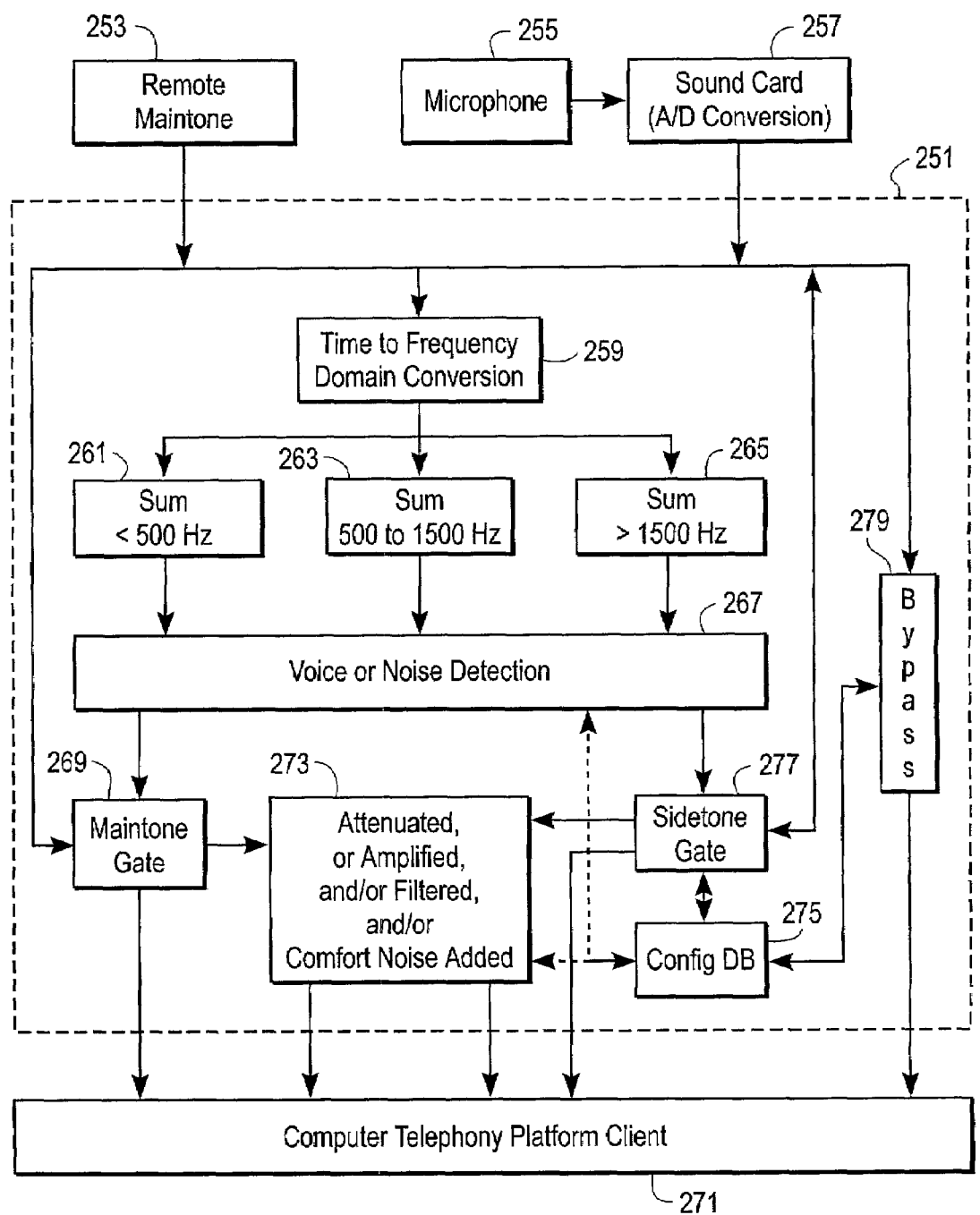
FIG. 5 shows a block diagram of one embodiment of the invention that can be utilized to remove noise in maintones and sidetones, according to a specific embodiment.

FIG. 5 shows a block diagram of an embodiment that detects and filters out noise using a triple output noise gate to enhance the sound quality of computer telephony systems. A software routine 251 receives input from a remote (inbound) maintone 253. Remote maintone 253 is the digital signal stream including telephony sound that is received from the other end of the connection. As another input to software routine 251, a microphone 255 can receive audio from a user that is then sent to a telephony client sound card 257 which, among other things, performs analog-to-digital (A/D) conversion. The digital signals from the sound card 257 are the basis for both the local (outbound) maintone for transmission for the remote end and the sidetone which is reproduced locally for the user (e.g., through the speaker in the headset).

Accordingly, the embodiment with the triple output noise gate shown in FIG. 5 can process simultaneously three audio streams: namely, the remote (inbound) maintone, the local (outbound) maintone, and the sidetone. The following will describe how each audio stream can be processed.

With regard to the local (outbound) maintone audio, microphone 255 picks up user speech, room background noise, and with some transducer choices may also pick up both the maintone from a remote system and a possible sidetone (e.g., it is fairly common to have acoustic coupling between speakers and a microphone, although this is fairly uncommon for headsets). The local maintone audio is converted from analog to digital by soundcard 257 which is then input to software routine 251.

Software routine 251 will be described as including multiple subroutines. However, it should be understood that the description of individual subroutines is for illustrative purposes and should not be used limit the invention to the described design. Additionally, the term "subroutine" is being used generally to represent a functional unit such as a function, procedure, object method, and the like. A subroutine 259 converts the digital signals from the time domain to the frequency domain. In some embodiments, this conversion is performed in sound card 257 so the mechanism for performing the time-to-frequency conversion can be varied.

The result of the time-to-frequency domain conversion is typically an amplitude value for every frequency interval (e.g., one per×Hertz) at a particular point in time. Subroutines 261, 263 and 265 add, normalize and total over time the amplitude values for three different frequency bands. For example, subroutine 261 processes frequencies below 500 Hertz, subroutine 263 processes frequencies between 500 and 1500 Hertz and subroutine 265 processes frequencies greater than 1500 Hertz. The normalization of the amplitude values is done to make the sum total comparable by adjusting to a standard bandwidth.

The values from subroutines 261, 263 and 265 represent how much audio volume per Hertz follows in each band or some given period in time. A subroutine 267 performs voice or noise detection. There are numerous techniques that can be utilized to detect noise or voice.

In one embodiment, there is an amplitude threshold such that if across all frequencies the amplitude threshold is exceeded, then it is determined that voice sounds are present. Otherwise, noise is assumed. Although this technique can be utilized, a lower error rate can be typically achieved utilizing the embodiment shown in FIG. 5.

Returning to FIG. 5, subroutine 267 determines that the audio is noise unless the amplitudes in the middle band are significantly higher than that of either of the low band or the high band. For example, if the amplitude values of the bands are substantially the same, then noise is present. This embodiment takes advantage of the concept that when no one is talking into the microphone, the microphone is just picking up background noise and the sounds will likely be more evenly distributed across the bands (or be concentrated in one or both bands at each extreme). For example when someone is talking, the sounds in the middle band are likely to be higher than in one or both of the other bands.

A subroutine 269 receives an indication whether the sounds represent voice or noise. If the determination has been made that the sounds represent voice, the digital signals are sent to a computer telephony platform client 271. Otherwise, if it is determined that the sounds represent noise, a subroutine 273 can attenuate, amplify, and/or filter the noise, add comfort noise, and any combination thereof.

In some embodiments, subroutine 273 attenuates the sounds so that silence will be transmitted instead of background noise when no voice has been detected. In other embodiments, noise can be replaced with "comfort noise," which is typically far lower in amplitude and uniform as opposed to louder and irregular in composition as in normal noise. Some users find that "comfort noise" is more appealing than either complete silence or the distracting nature of transmitted noise. After processing by subroutine 273, the digital signals are sent to computer telephony platform client 271. As indicated, other processing such as filtering can be utilized in subroutine 273. For example, the filtering may act to reduce the amplitude of all frequency bands where noise is generally more prevalent than voice.

In some embodiments, the cutoffs for the different bands and the extent to which the middle band should be above the outer bands are stored in a configuration database 275. In this way, a user can manipulate a graphical user interface (GUI) to modify the values. For example, a user can increase or decrease the sensitivity of the noise gating to adapt to an unusually noisy (e.g., a factory floor) or quiet environment. Thus, the invention is not limited to these specific bands shown in FIG. 5 but may be applied to different bands, different numbers of bands, different thresholds, and the like. An example of a GUI window will be discussed in more detail in reference to FIG. 13.

Sidetone audio signals can be processed in a manner that is similar to that which has been described in reference to the local maintone. However, it may be preferable to make the processing of sidetone audio signals dependent upon additional factors. Specifically, the factors can include the amount of non-room noise present in the computer telephony system, the degree to which users minimize room noise in response to its sidetone reproduction and the degree to which users are sensitive to the Lombard Effect (i.e., users will raise their voices if they hear noise). These factors will be described in more detail below.

Some computer telephony systems contain significant amounts of background noise originating not within the room in which a microphone resides but rather in the sound processing circuitry itself. For example, within personal computers are video and other circuitry that gives off electromagnetic radiation that can be coupled into analog sound in the computer and emerge in the speaker as noise. Such systems where this induced noise is a major factor will not necessarily benefit from the use of sidetone reproduced as noise as a feedback loop to encourage the minimization of room noise. As a result, in these systems, the noise component of the sidetone is preferably attenuated or silenced, as it is in the local maintone by subroutine 273. It may be beneficial to apply stronger attenuation to such sidetone signals.

In systems where room noise predominates, it may be advantageous to make the room noise a component in the sidetone to act as a feedback mechanism to get users to address the source of the noise. For example, if a user is noisily shuffling his papers, reproducing the noise that is generated in the sidetone can have the desired effect of causing the user to stop shuffling the papers. In such cases, sidetone gate 277 can direct the sidetone signals unattenuated to computer telephony platform 271. In some embodiments, the sidetone can also be processed by subroutine 273 to amplify the noise and mix it back into the sidetone to enhance this feedback effect.

Another factor that can be analyzed is what is known as the Lombard Effect, which is the observation that most users will raise their voices in the presence of noise. As a result, it can be advantageous to include noise in the sidetone, in those cases where the sidetone can be prevented from being picked up by the microphone or in those cases where such feedback can be canceled. Environments that may be candidates for this type of processing may be headsets that reduce this coupling when worn or hardware that includes echo cancellation chips such as are currently available in cellular telephones but may not be adapted for computer sound cards and microphones. In these environments, a higher gain to the sidetone signal can be applied to noise. The sidetone signal can be applied during noise so that the users will be encouraged to speak louder. The common speaker/microphone combination is generally a bad candidate for this technique because of the potential for feedback.

The determination of which of these techniques to use can be configured in configuration database 275. The default values may be set by the manufacture of equipment or by the computer telephony application upon installation. Additionally, a GUI can be utilized to allow a user to change default settings to customize these values for her particular environment.

The above has described situations where audio signals may be attenuated, silenced or amplified. In other situations, the audio signals may be filtered. Some frequency bands typically have noise that predominates over voice. In these frequency bands, subroutine 273 can attenuate (or amplify) these bands. Because this band filtering operates on both voice and noise, this technique may be more applicable for sidetone than for maintone. Typically, the default may be not to perform filtering of this type.

Configuration database 275 can also be utilized to activate a subroutine 279 that bypasses the processing of audio signals and passes them unmodified to computer telephony platform client 271. This can be useful for testing and in environments where no processing is needed.

As for the remote (inbound) maintone, typically this stream is either passed straight through utilizing bypass subroutine 279 or is processed in the same manner as described above for the local (outbound) maintone. Additionally, configuration 275 can specify the specific way in which the remote maintone can be processed which may be different than the local maintone. The option for processing the remote maintone can be beneficial for communicating with systems that do not process their own local maintone or process the local maintone in a less effective manner.

In one embodiment, the default is to process the remote maintone unless at the beginning of a call, an exchange in a Supplementary Services protocol (such as H.450) indicates the arriving maintone has already been noise gated by the software that is running locally. Thus, in addition to the specific processing that is stored in configuration database 275 for the remote maintone, an embodiment may have three configuration options for the remote maintone: never noise gate the remote maintone, noise gate the remote maintone except when signaled by a remote node that this processing has already been done on the remote node, and always noise gate the remote maintone.

Figure 6:
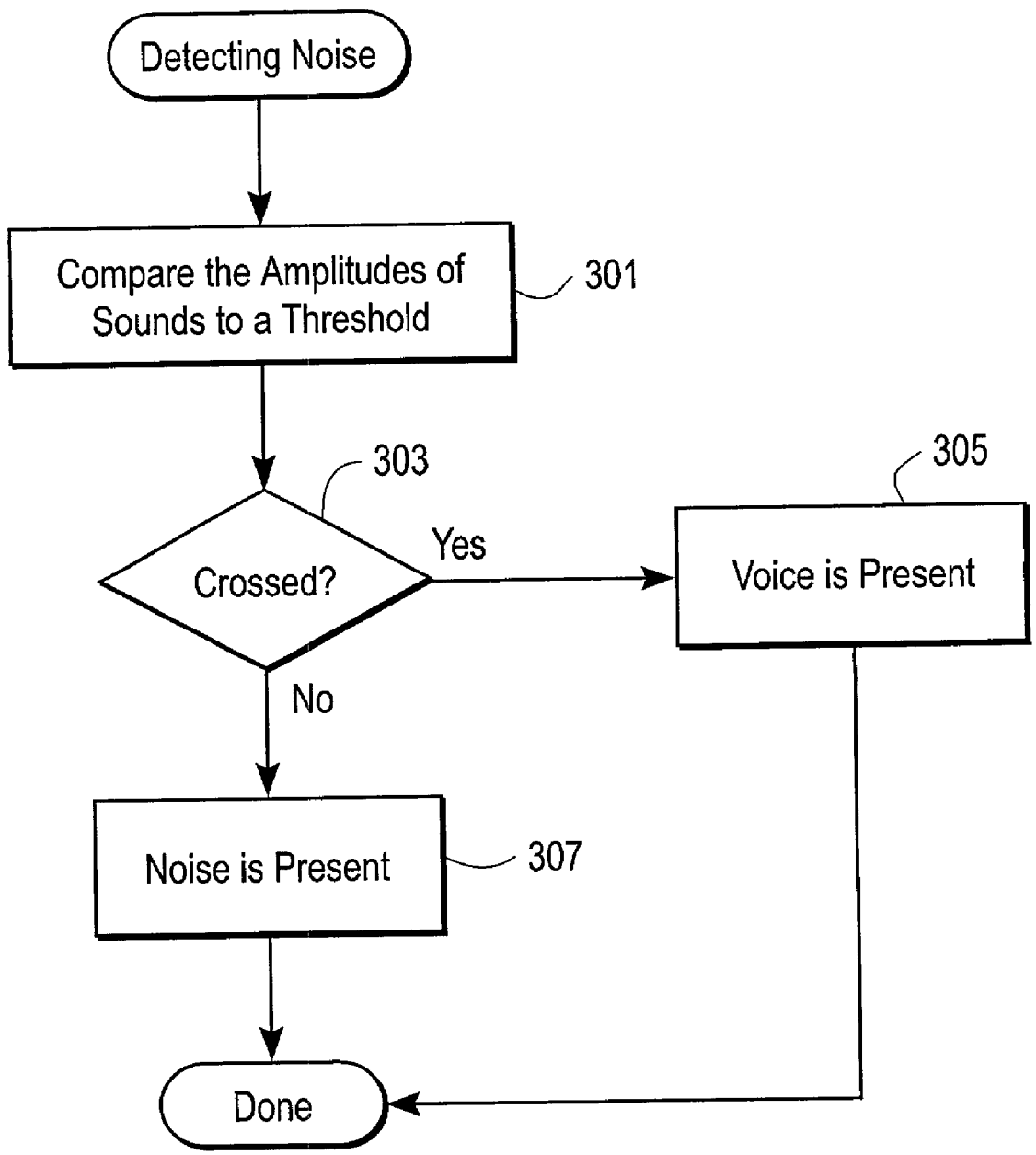
FIG. 6 shows a flowchart of a process of detecting whether noise is present by comparing the amplitudes of sounds to a threshold, according to a specific embodiment.
Figure 7:
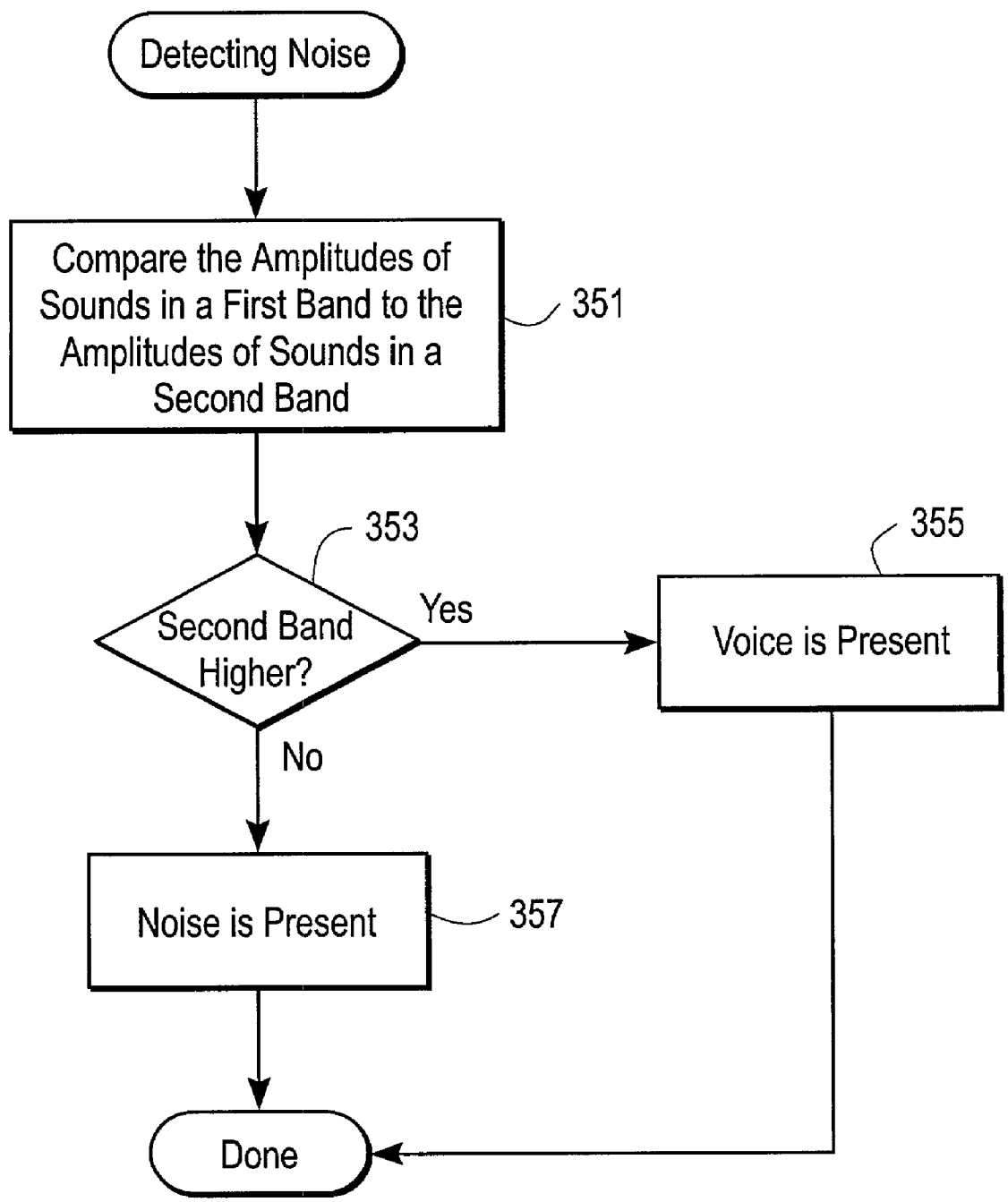
FIG. 7 shows a flowchart of a process of determining whether noise is present by comparing the amplitudes of sounds in a first band to the amplitudes of sounds in a second band, according to another specific embodiment.
Figure 8:
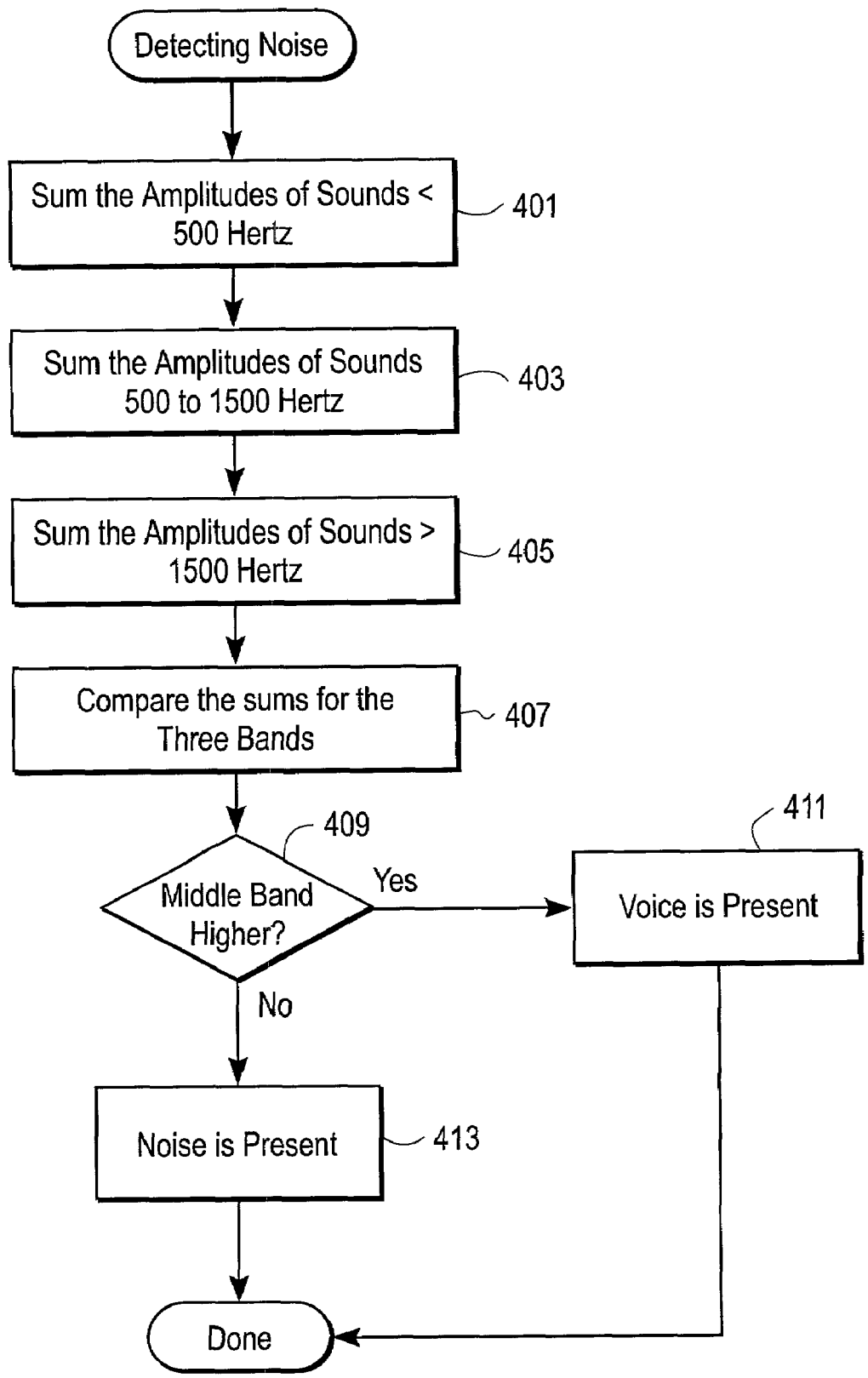
FIG. 8 shows a flowchart of a process of determining whether noise is present by comparing the amplitudes of sounds from a low band, middle band and high band, according to specific embodiments.

FIGS. 6, 7 and 8 will describe flow charts of processes that can be utilized to detect noise (or voice) in subroutines such as subroutines 267. Starting with FIG. 6, the amplitudes of sounds are compared to a threshold at a step 301. The amplitudes can be from all the frequencies or from one or more bands of frequencies.

If it is determined that the threshold has been crossed at a step 303, then it is determined that voice is present at a step 305. Otherwise, it is determined that noise is present at a step 307. As described above, once it has been determined that noise is present, the noise can be attenuated, be amplified, be filtered, have comfort noise added, or any combination thereof, and the like.

FIG. 7 shows a flow chart of another process of detecting noise, according to another embodiment. At a step 351, the amplitudes of sounds in a first band are compared to the amplitudes of sounds in a second band. It has been estimated that the average human voice can produce sounds that vary from 300 Hertz to 3600 Hertz. Accordingly, one technique of detecting noise (or voice) is to compare the amplitudes of sounds in a first band that includes sounds outside the range of the human voice to a second band that includes sounds within the range of the human voice. If the amplitudes of sounds in the second band are significantly higher than the amplitudes of sounds in the first band, the audio stream includes voice. Otherwise, the audio stream is noise.

There are many ways to determine whether the amplitudes of a second band are significantly higher than those of the first band. Such methods including amplitude thresholds, percentage thresholds, and the like. Additionally, the frequencies that are in the first and second bands can vary depending on the application environment and user selections. If it is determined at a step 353 that the amplitudes of the second band are sufficiently higher than those of the first band, it is determined that noise is not present and voice is present at a step 355. Otherwise, it is determined that noise is present at a step 357. This technique of comparing multiple bands can be extended to three bands as will be discussed in more detail in reference to FIG. 8 and can be extended to four or more bands utilizing the principles described herein.

FIG. 8 shows a flow chart of a process of detecting noise that compares three bands. In this embodiment, the three bands will be referred to as a low band, a middle band and a high band. For illustrative purposes, the low band includes sounds that are below 500 Hertz, the middle band includes sounds between 500 and 1500 Hertz, and the high band includes sounds greater than 1500 Hertz. Since the middle band falls roughly in middle range of the average human voice, the middle band is being utilized as the band that corresponds to voice sounds.

At a step 401, the amplitudes of sounds that have a frequency of less than 500 Hertz are summed. Similarly, the amplitudes of sounds with frequencies between 500 to 1500 Hertz are summed at a step 403. Also, the amplitudes of sounds with frequencies greater than 1500 Hertz are summed at a step 405. Typically, the summation of sounds includes sounds over a specific time interval and the summation operations can be performed simultaneously (or the summation operations can be performed in any order).

The amplitude sums for low, middle and high bands are compared at a step 407. If it is determined in a step 409 that the sums for the middle band are significantly higher than either or both of those for the low and high bands, it is determined that voice is present at a step 411. Otherwise, it is determined that noise is present at a step 413. Thus, it can be determined that noise is present if the amplitudes of sounds in the low, middle and high bands are substantially the same.

The above embodiments have described techniques in which it was determined in real time that the audio stream represented either voice or noise during any particular interval. The interval of the audio stream was then attenuated, amplified, filtered, comfort noise added or other processing based on this determination, which can be repeated for the next interval of the audio stream. In other embodiments, the determination of voice or noise can be directed at specific bands of frequencies and the process being applied to those bands as desired. These techniques can be applied to the above embodiments and will be illustrated in more detail in the following embodiments.

Computer telephony systems can suffer from many different types of sound quality degradations. One degradation can be caused by a 50 or 60 Hertz hum (and possibly harmonics of these frequencies) introduced either into an analog trunk and transferred to the computer telephony system through a gateway or into the analog input section of a computer sound card. Another degradation can be caused by impedance mismatches that can lead to what is commonly described as "whistling" or "singing" in the telephony audio. Another degradation can occur for computer telephony calls that pass through a gateway to the PSTN. These calls passing through gateways can have a "metallic" sound when those gateways that convert the digital signals to analog signals and then back to digital signals. This is typically due to an aliasing problem that results in high frequency noise components. Another degradation can be caused by a variety of ambient room background noises that enter the computer telephony systems through a microphone or a handset/headset. The low (e.g., heating and cooling system rumble) and high (e.g., electronic equipment) frequency components are often the cause of this type of sound quality degradation.

These degradations of computer telephony audio quality can be remedied or mitigated by filtering out the undesirable noise. These audio quality problems also have the advantage that all or much of the noise falls outside of the normal traditional telephony bandwidth of 300 to 3600 Hertz. Depending on the codec and sampling rate chosen, computer telephony systems are often able to transmit a broader spectrum of sound and are thus subject to noise components that are transmitted easily in computer telephony systems but are effectively removed as a result of the more limited analog bandwidth of traditional systems.

In these embodiments, when noise components below 300 Hertz or above 3600 Hertz are detected in a computer telephony stream, an appropriate filter (or filters) is activated to remove the detected noise. Additionally, if noise is present both below 300 Hertz and above 3600 Hertz, the analog bandwidth being transmitted is reduced from the often higher computer telephony levels to the traditional level so that the detected noise will be excluded. If only low frequency noise is detected, audio below 300 Hertz can be filtered out while allowing the audio above 300 Hertz to pass (e.g., high pass filter), resulting in better fidelity at high frequencies. Conversely, if only high frequency noise is present, the audio above 3600 Hertz can be filtered out while allowing all audio below 3600 Hertz to pass. Although the low and high frequency thresholds of 300 Hertz and 3600 Hertz can be utilized, the invention is not limited to these specific frequencies and other frequencies can be advantageously selected in other embodiments.

Another problem that can degrade computer telephony audio is power line frequency noise. Power line hum can be present at typical power line frequencies of 50 and 60 Hertz and can include one or two harmonic frequencies such as 100 Hertz, 120 Hertz, 150 Hertz and 180 Hertz. If power line hum or noise is detected, notch filters can be utilized to block a narrow segment of frequency surrounding these power line frequencies and harmonics.

Various ways have been described that can degrade computer telephony audio, but not all problems will be present in all systems. However, even with systems that have been designed to reduce or eliminate these problems, such systems may need to communicate with other systems that may have one or more of the preceding problems. Accordingly, it may be preferable to include the techniques described herein at both the client and the gateway.

Figure 9:
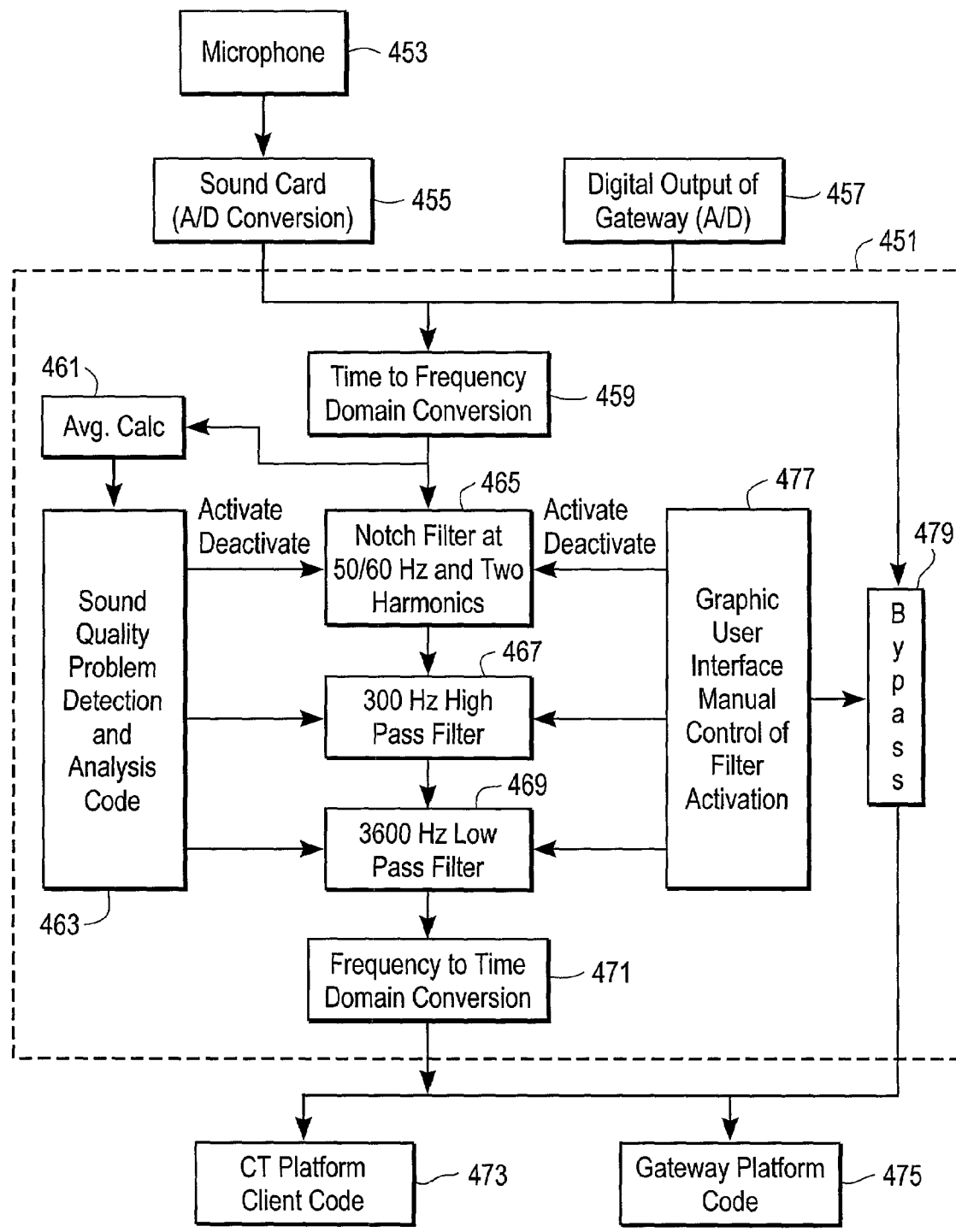
FIG. 9 shows a block diagram of another embodiment of the invention that can remove noise at low frequencies, high frequencies, power line frequencies, and any combination thereof.

FIG. 9 shows a block diagram of an embodiment that can detect different types of noise and be configured to filter out the detecting noise. A software routine 451 receives digital signals including telephony sounds, detects noise, and filters out the detected noise. The inputs for a routine 451 can be from a microphone 453 that receives voice sounds from a user to the computer telephony client sound card 455, which typically performs A/D conversion. Additionally, routine 451 can receive digital signals as digital output 457 from a gateway. Typically, digital output 457 is after the A/D conversion within the gateway, either at an analog trunk input or after an internal A/D conversion. It should be noted that the A/D conversion is typically preceded by a D/A conversion by a digital trunk or a LAN. The invention described herein can be utilized in all of these contexts and others that are applicable.

Once routine 451 receives the digital signals including telephony sounds, a subroutine 459 converts the digital signals from the time domain to the frequency domain. A running average is calculated for the amplitudes of sounds over a bandwidth (e.g., the audible frequency bandwidth) by a subroutine 461. In one embodiment, the running average calculation is performed over a time interval. Additionally, frequency amplitudes that are less than about 5% of the running average value (including 0) may not be included in the running average calculation. The running average calculation is utilized to detect different types of noise in the computer telephony audio stream.

A subroutine 463 detects different types of noise (or sound quality problems) and activates filters to remove the detected noise. With regard to power line frequency noise, as discussed above, the leakage of power line frequencies and their harmonics into analog audio circuitry can cause a low frequency hum. The power line frequencies and their first and second harmonics for most of the world are 50 Hertz, 60 Hertz, 100 Hertz, 120 Hertz, 150 Hertz, and 180 Hertz. If the amplitude of any of these frequencies is about 5% of the running average as calculated by subroutine 461, a notch filter 465 is activated to remove the noise at these frequencies.

Figure 10:
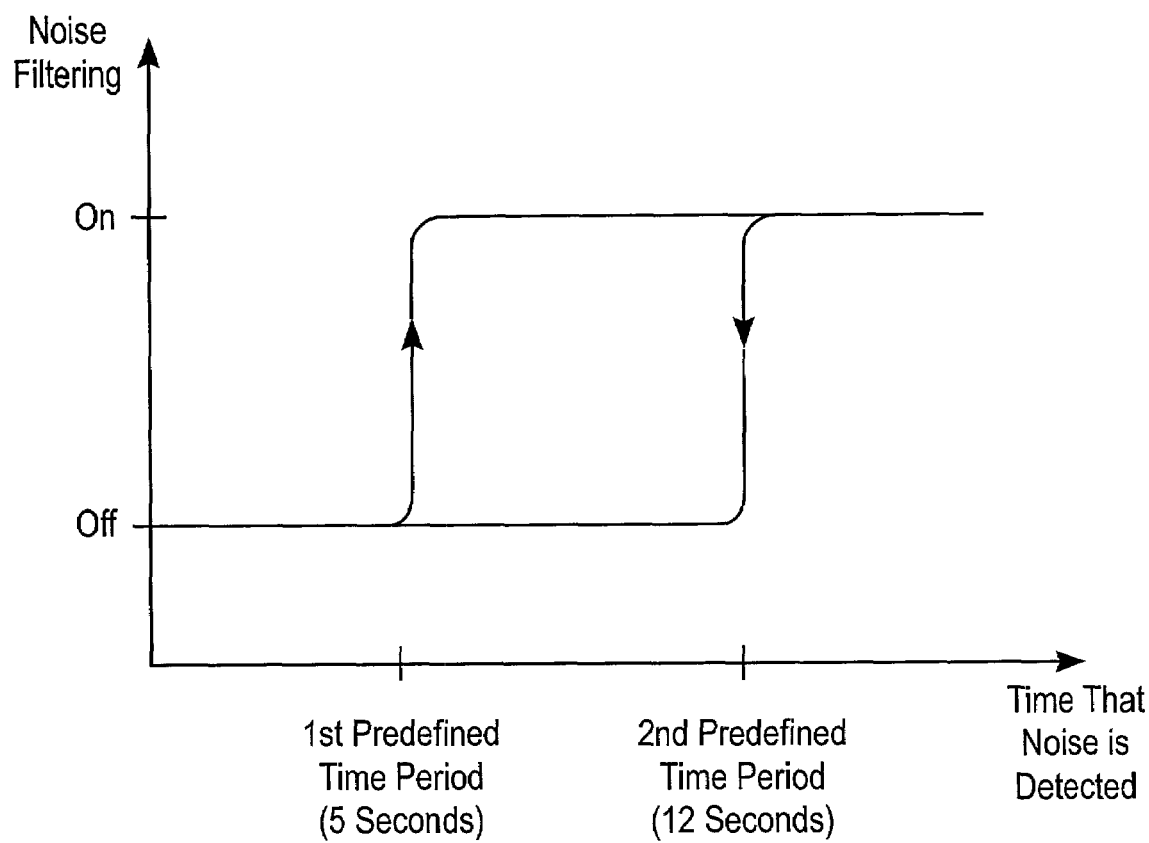
FIG. 10 shows a chart illustrating a hysteresis effect that can be used in turning noise filters on and off, in accordance with some specific embodiments of the invention.

In some embodiments, it may be desirable to reduce the number of times that the filters are turned on and off. One mechanism for achieving this is to activate the appropriate filter if the amplitude at the frequency of interest is above a threshold (e.g., 5% of the running average) for a time interval (e.g., 5 seconds). Similarly, the filter can be deactivated for the frequency of interest until the amplitude fails to exceed the threshold for a time interval (e.g., 12 seconds). In particular, FIG. 10 shows an exemplary chart illustrating this hysteresis that can be used in turning noise filters on and off, in accordance with some specific embodiments of the invention. For example, FIG. 10 shows two states (on or off) for the filtering and when noise is detected (e.g., exceeds a threshold) for a first predefined time period (e.g., 5 seconds), the noise filtering is turned on and stays on. When the filtering is on, and if the noise is not detected (e.g., does not exceed the threshold) for at least a second predefined time period (e.g., 12 seconds), then the filtering is turned off. In this manner, the filters can be turned on or off depending on the characteristics of the audio stream in the past for these specific embodiments. Since the digital signals have been converted to the frequency domain, these calculations are typically direct and fast.

If requested, subroutine 463 can also analyze frequencies between 0 and 300 Hertz to determine if any of these frequencies exceed about 5% of the running average. If an amplitude for a frequency in this low range exceeds the thresholds, a 300 Hertz high pass filter 467 can be activated to remove the noise below 300 Hertz. As before, in one embodiment, high pass filter 467 is activated if the amplitude of a frequency in the band exceeds the threshold for a specific amount of time and the filter is deactivated if no amplitudes in the frequency band exceed the threshold for a specific amount of time.

If requested, subroutine 463 can employ a 3600 Hertz low pass filter 469 to remove noise that is detected above 3600 Hertz. Although the similar threshold of about 5% of the running average and time intervals of five and twelve seconds can be utilized, other thresholds and/or time intervals can be utilized in other embodiments. Digital signals that have noise that is detected in both the low band and the high band can be filtered such that only frequencies between 300 Hertz and 3600 Hertz remain.

In one embodiment, the digital signals are passed sequentially through filters 465, 467 and 469. Although this order can be utilized, the invention is not limited to this sequential use of filters or any particular ordering of the filters. Software notch, high and low pass filters are known in the art, but preferably these filters are implemented with very little ripple in the pass band, a narrow transition band, little phase shift and high rejection and low ripple in the stop band.

The digital signals that exit the filters pass through a subroutine 471 that performs conversion from the frequency domain to the time domain. Such signals then can be routed to either computer telephony platform client code 473 or gateway platform 475 depending upon whether the original digital signals came from sound card 455 or gateway digital output 457.

A computer telephony system can have default values for indicating whether each of the filters can be activated, for thresholds and/or conditions for activating and deactivating the filters, and for the frequencies that delineate the bands of interest. Additionally, a subroutine 477 can be utilized to present a graphical user interface (GUI) for presenting a window that allows a user to manually control the filters and their associated values. An example of a GUI window that can be utilized for this purpose will be described in more detail in reference to FIG. 13.

As shown, subroutine 477 can allow the user to specify that the digital signals will pass through a bypass 479 unmodified. Thus, no conversion or filtering of the digital signals is performed. However, it may advantageous in some embodiments to allow subroutine 461 to continue to calculate a running average so that if the filters are enabled, the running average will be available to detect the noise of interest.

The rational for utilizing a specific amount of time or time period for the activation and deactivation of a filter is that normal speech and most music are very dynamic in using the audio spectrum. Thus, if a frequency of interest maintains an amplitude above (or below) a threshold for the specified time period, it is likely that this is an indication of noise (or voice). Once again, although the thresholds and time intervals described herein can be utilized, other thresholds and conditions can be advantageously applied to other implementations.

Figure 11:
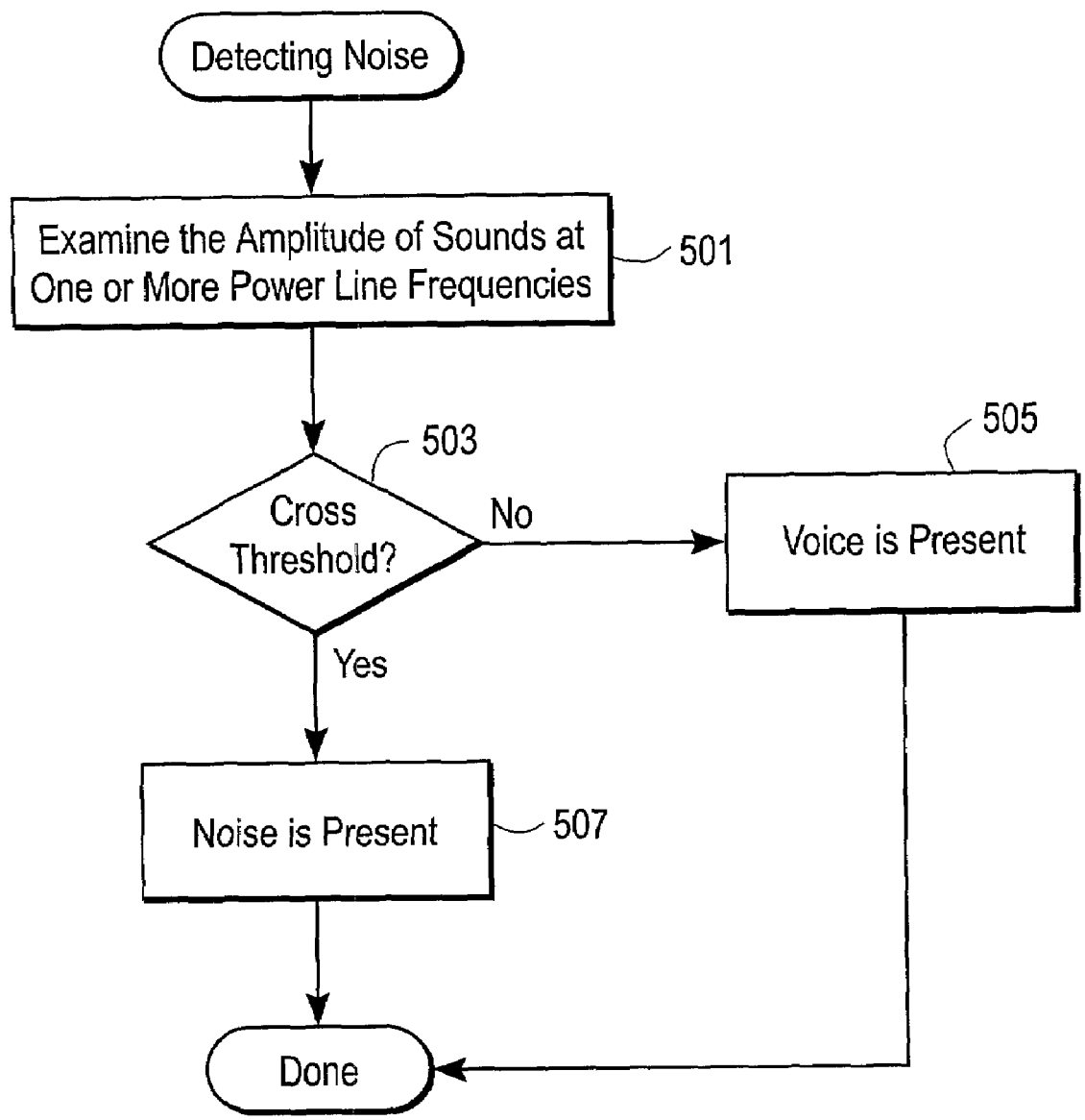
FIG. 11 shows a flowchart of a process of determining whether noise is present by examining the amplitudes of sounds at one or more power line frequencies, according to a specific embodiment.

FIG. 11 shows a flow chart of a process of detecting noise at one or more power line frequencies. This process is just one example of processes that can be utilized by subroutine 463 to detect noise and power line frequencies.

At a step 501, the amplitudes of sounds of one or more power line frequencies are examined. The amplitudes of sounds are examined to determine if they cross a threshold. For example, the threshold can be about 5% of the running average of amplitudes of sounds.

If it is determined at a step 503 that the amplitudes of sounds at one or more power line frequencies do not cross the threshold, it is determined that noise is not present (but voice or music or other desired sounds are present) at a step 505. Otherwise, it is determined at a step 507 that noise is present and thus, filter 465 can be activated to remove the detected noise. Alternatively, in systems with severe memory constraints, filter 467 could be activated instead of filter 465 (i.e., filter 465 is not necessary), which would filter sounds below 300 Hertz including the power line frequencies and their harmonics.

Figure 12:
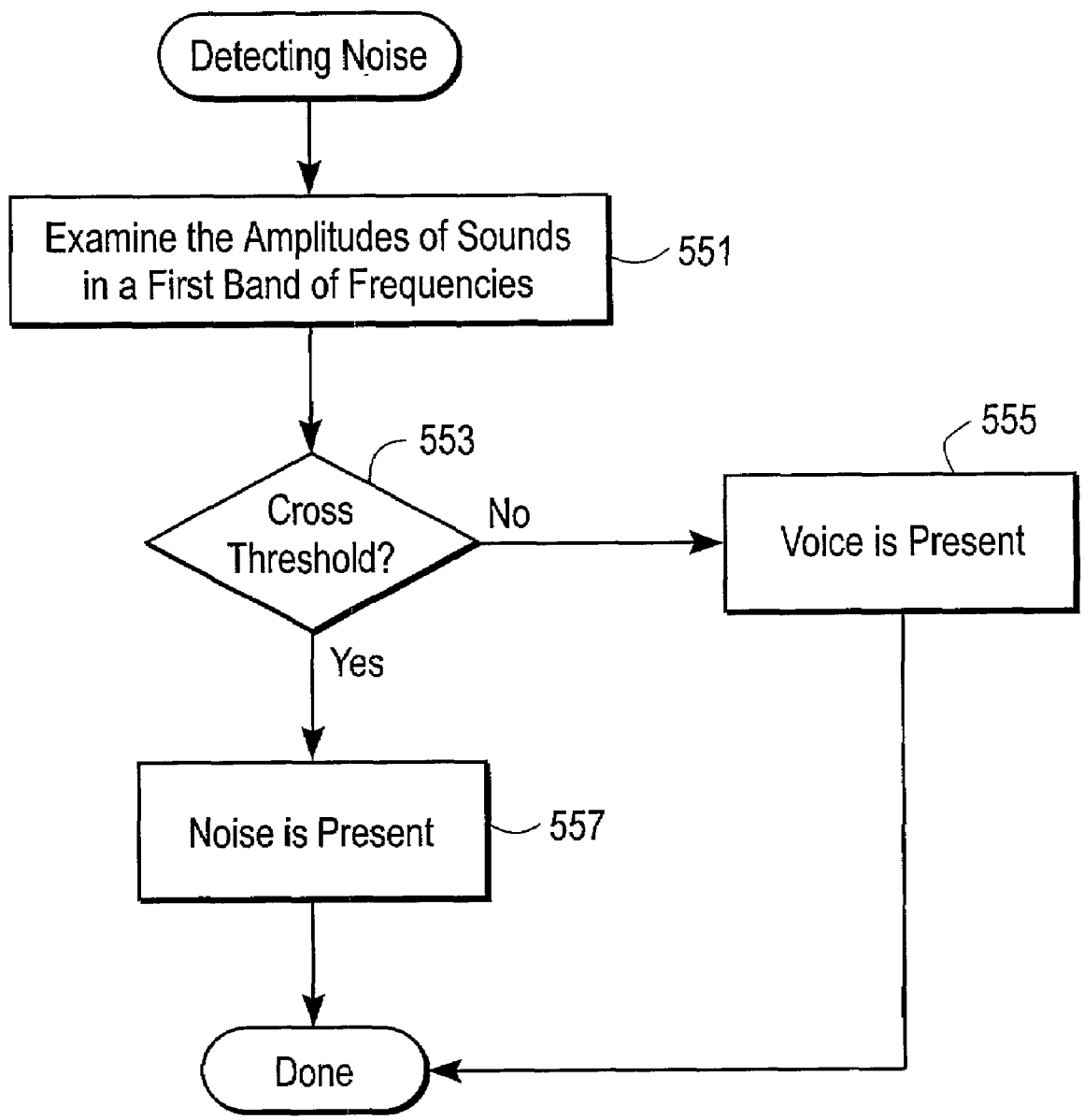
FIG. 12 shows a flowchart of a process of determining whether noise is present by examining the amplitudes of sounds in a specific band of frequencies, according to another specific embodiment.

FIG. 12 shows a flow chart of a process of detecting noise in a first band of frequencies. This process can be utilized by subroutine 463 to detect noise in the low and high bands. At a step 551, the amplitudes of sounds in a first band of frequencies are examined. This first band of frequencies can represent frequencies below a certain frequency (e.g., 300 Hertz) or above a certain frequency (e.g., 3600 Hertz). Additionally, the first band of frequencies can represent any band of frequencies (including middle bands) in which it may be desirable to remove noise.

If at a step 553 it is determined that the amplitudes of sounds in a first band of frequencies do not cross a threshold, it is determined that noise is not present at a step 555. Otherwise, it is determined that noise is present at a step 557 and an appropriate filter, such as filter 467 or 469, can be activated to remove the detected noise.

Figure 13:
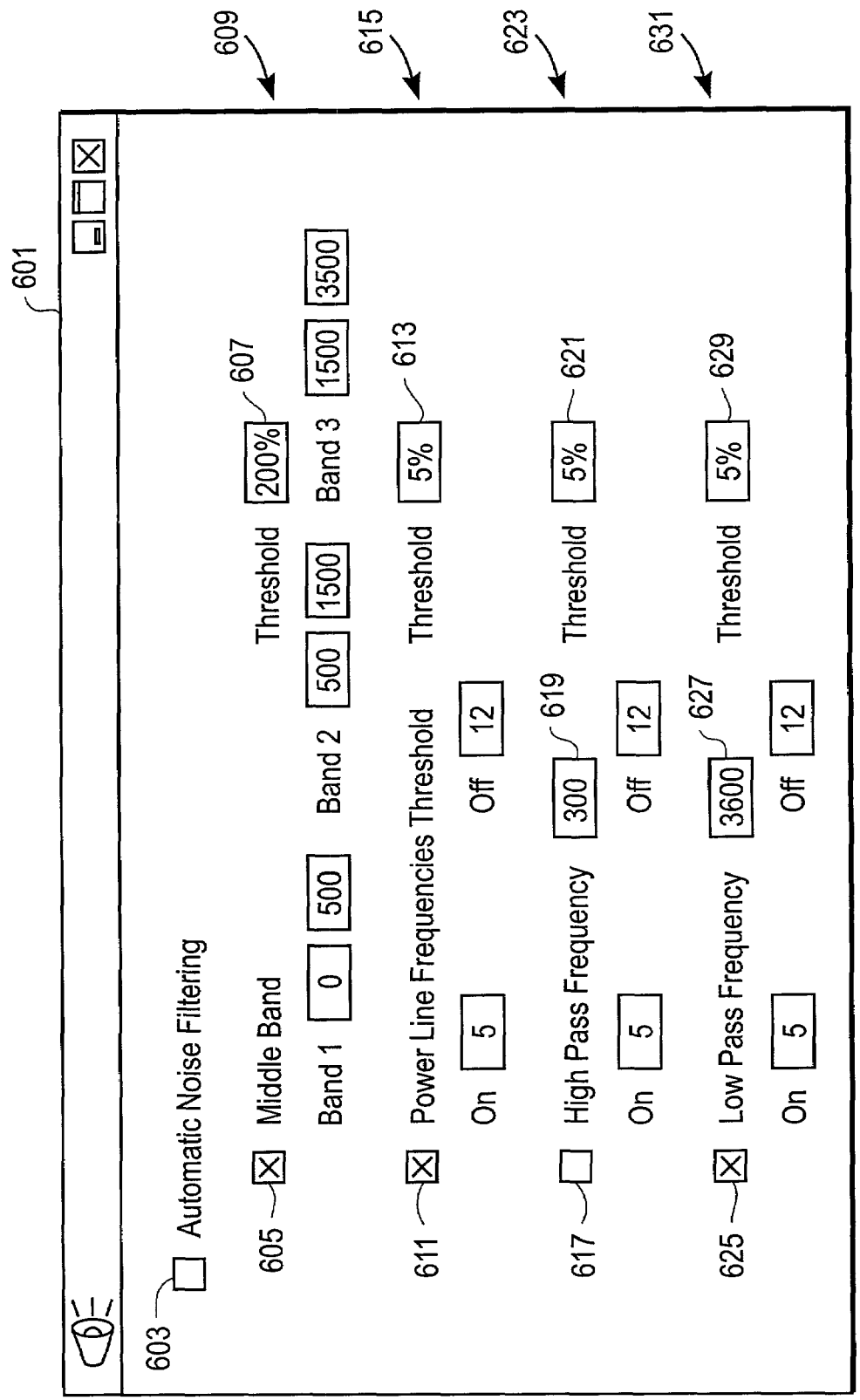
FIG. 13 shows an example of a graphical user interface (GUI) window that can be utilized to allow a user to manually configure noise filtering, according to specific embodiments.

FIG. 13 shows an example of a GUI window that can be presented to a user to configure the filtering of noise. A window 601 shows GUI checkboxes that can be checked or unchecked by the user in order to indicate the specific filtering that should be performed. A checkbox 603 can be utilized to indicate that the user would like to have automatic noise filtering. With automatic noise filtering, the filter that is performed and the threshold may be the default values, such as are set by the manufacturer of the computer telephony system.

If checkbox 603 is unchecked as shown, a user is able to manually configure the filtering that will be performed and parameters for the filter. A checkbox 605 indicates that the user would like the middle band to be analyzed in order to detect noise as was described in reference to FIGS. 5-8. A box 607 indicates the threshold at which the amplitudes of the middle band should exceed those of the low and high bands in order to indicate voice. The threshold shown is 200% of the low and high bands. As described earlier, if the amplitudes of the middle band do not exceed the threshold, then it is determined that noise is present and the noise is filtered. Boxes 609 allow the user to specify the individual bands of frequencies. Although three bands are shown, the principles can be applied to fewer or more bands by an extension of these principles.

A checkbox 611 indicates whether power line frequency noise should be filtered. A box 13 indicates the threshold that will be utilized to activate and deactivate the filter. Boxes 615 can be utilized to set the time periods that a power line frequency should exceed the threshold in order to activate (turn on) or deactivate (turn off) the filter. A checkbox 617 can be utilized to specify that high pass filtering of noise should be performed. A box 619 allows the user to specify the frequency at which higher frequencies will be passed if the filter is activated. The relevant threshold can be specified at a box 621. Additionally, boxes 623 can be utilized to indicate the time periods for activating and deactivating the high pass filter.

Similarly, a checkbox 625 can be utilized to indicate that low pass filtering should be performed. A box 627 can be utilized to specify the frequency at which lower frequencies will be passed when the filter is activated. A threshold for activating or deactivating the filter can be specified at a box 629. Lastly, boxes 631 can be utilized to specify time periods for activating and deactivating the low pass filter.

While the above are complete descriptions of exemplary embodiments of the invention, various alternatives, modifications and equivalents can be used. It should be evident that the invention is equally applicable by making appropriate modifications to the embodiments described above. For example, the techniques described above were utilized to enhance audio quality for computer telephony systems, but the invention can also be advantageously applied to enhancing audio of other systems. Therefore, the above description should not necessarily be taken as limiting the scope of the invention that is defined by the metes and bounds of the following claims along with their full scope of equivalents.

What is claimed is:

1. A computer implemented method of enhancing sound quality for computer telephony systems, comprising:
   receiving digital signals including telephony sounds;
   performing time-to-frequency domain conversion on the digital signals;
   detecting whether noise is present in the frequency domain conversion of the digital signals by examining amplitudes of sounds in a plurality of frequency bands and determining that noise is present by determining whether the amplitudes of the plurality of frequency bands cross a threshold; and applying a filter to remove the noise if noise was detected in the frequency domain conversion of the digital signals.

2. The method of claim 1, wherein detecting whether noise is present comprises:
examining the amplitude of sounds in a first band in the frequency domain conversion of the digital signals over a time interval; and
determining noise is present if the amplitude of sounds in the first band cross a threshold over the time interval.

3. The method of claim 1, wherein the filter is applied if noise is detected for a specific time period.

4. The method of claim 1, wherein the filter is no longer applied if noise is not detected for a specific time period.

5. The method of claim 1, wherein the filter is a software filter.

6. A computer implemented method of enhancing sound quality for computer telephony systems, comprising:
receiving digital signals including telephony sounds;
performing time-to-frequency domain conversion on the digital signals;
detecting whether noise is present in the frequency domain conversion of the digital signals by examining amplitudes of sounds in a plurality of frequency bands; and
applying a filter to remove the noise if noise was detected in the frequency domain conversion of the digital signals;
wherein detecting whether noise is present comprises:
comparing the amplitudes of sounds in the frequency domain conversion of the digital signals; and
determining noise is present by determining whether the amplitudes in a predetermined number of bands cross a threshold.

7. A computer implemented method of enhancing sound quality for computer telephony systems, comprising:
receiving digital signals including telephony sounds;
performing time-to-frequency domain conversion on the digital signals;
detecting whether noise is present in the frequency domain conversion of the digital signals by examining amplitudes of sounds in a plurality of frequency bands; and
applying a filter to remove the noise if noise was detected in the frequency domain conversion of the digital signals;
wherein detecting whether noise is present comprises:
comparing the amplitude of sounds in a first band to the amplitude of sounds in a second band in the frequency domain conversion of the digital signals; and
determining noise is present if the amplitudes of sounds in the first and second bands are substantially the same;
wherein the first band comprises sounds outside the range of a human voice and the second band comprises sounds within the range of the human voice.

8. A computer implemented method of enhancing sound quality for computer telephony systems, comprising:
receiving digital signals including telephony sounds;
performing time-to-frequency domain conversion on the digital signals;
detecting whether noise is present in the frequency domain conversion of the digital signals by examining amplitudes of sounds in a plurality of frequency bands; and
applying a filter to remove the noise if noise was detected in the frequency domain conversion of the digital signals;
wherein detecting whether noise is present comprises:
comparing the amplitudes of sounds in low, middle and high bands in the frequency domain conversion of the digital signals; and
determining noise is present if the amplitudes of sounds in the low, middle and high bands are substantially the same.

9. The method of claim 8, wherein the low band includes sounds less than 500 Hertz, the middle band includes sounds from 500 to 1500 Hertz and the high band includes sounds greater than 1500 Hertz.

10. A computer implemented method of enhancing sound quality for computer telephony systems, comprising:
receiving digital signals including telephony sounds;
performing time-to-frequency domain conversion on the digital signals;
detecting whether noise s present in the frequency domain conversion of the digital signals if the amplitudes of sounds in first and second bands in the frequency domain conversion of the digital signals are substantially the same; and
applying a filter to remove the noise if noise was detected in the frequency domain conversion of the digital signals;
wherein the first band comprises sounds outside the range of a human voice and the second band comprises sounds within the range of the human voice.

11. A computer implemented method of enhancing sound quality for computer telephony systems, comprising:
receiving digital signals including telephony sounds;
performing time-to-frequency domain conversion on the digital signals;
comparing the amplitude of sounds in a third band to the amplitudes of sounds in first and second bands in the frequency domain conversion of the digital signals; and
determining noise is present if the amplitudes of sounds in the first, second and third bands are substantially the same; and
applying a filter to remove the noise if noise was detected in the frequency domain conversion of the digital signals.

12. The method of claim 11, wherein the first band includes sounds less than 500 Hertz, the second band includes sounds from 500 to 1500 Hertz and the third band includes sounds greater than 1500 Hertz.

13. The method of claim 11, wherein the amplitude of sounds is an average over a time interval.

14. A computer implemented method of enhancing sound quality for computer telephony systems, comprising:
receiving digital signals including telephony sounds;
performing time-to-frequency domain conversion on the digital signals;
detecting whether noise is present in the frequency domain conversion of the digital signals if the amplitude of sounds in a middle band exceeds the amplitudes of sounds in low and high bands by a predetermined amount; and
applying a filter to remove the noise if noise was detected in the frequency domain conversion of the digital signals.

15. The method of claim 14, wherein the low band includes sounds less than 500 Hertz, the middle band includes sounds from 500 to 1500 Hertz and the high band includes sounds greater than 1500 Hertz.

16. The method of claim 14, wherein the amplitude of sounds is an average over a time interval.

17. A computer implemented method of enhancing sound quality for computer telephony systems, comprising:
receiving digital signals including telephony sounds;
performing time-to-frequency domain conversion on the digital signals;
detecting whether noise is present in the frequency domain conversion of the digital signals if the amplitudes of sounds in a plurality of frequency bands in the frequency domain conversion of the digital signals cross a threshold over a time interval; and
applying a filter to remove the noise if noise was detected in the frequency domain conversion of the digital signals and replacing at least a portion of the noise with comfort noise.

18. The method of claim 17, wherein applying a filter comprises applying a low pass or high pass filter.

19. The method of claim 17, wherein the amplitude of sounds is an average over a time interval.

20. A computer implemented method of enhancing sound quality for computer telephony systems, comprising:
receiving digital signals including telephony sounds;
performing time-to-frequency domain conversion on the digital signals;
detecting whether noise is present in the frequency domain conversion of the digital signals for a first specific time period by examining amplitudes of sounds in a plurality of frequency bands, said detecting including determining if the amplitudes of sounds in the plurality of frequency bands exceed a threshold; and
applying a filter to remove the noise if noise was detected in the frequency domain conversion of the digital signals.

21. The method of claim 20, wherein said filter applying step is not performed if noise is not detected for a second specific period longer than said first specific time period.

22. A computer program product that enhances sound quality for computer telephony systems, comprising:
computer code for a processor that receives digital signals including telephony sounds;
computer code that performs time-to-frequency domain conversion on the digital signals;
computer code that detects whether noise is present in the frequency domain conversion of the digital signals if the amplitude of sounds in a middle band exceeds the amplitudes of sounds in low and high bands by a predetermined amount;
computer code that applies a filter to remove the noise if noise was detected in the frequency domain conversion of the digital signals; and
a computer readable medium that stores the computer codes, said computer readable medium comprising at least one of a CD-ROM, a floppy disk, a tape, a flash memory, a system memory or a hard drive.

23. The computer program product of claim 22, wherein the low band includes sounds less than 500 Hertz, the middle band includes sounds from 500 to 1500 Hertz and the high band includes sounds greater than 1500 Hertz.

24. The computer program product of claim 22, wherein the amplitude of sounds is an average over a time interval.

25. A computer implemented method of enhancing sound quality for computer telephony systems, comprising:
receiving digital signals, said digital signals being computer telephony signals and including an inbound maintone and an outbound maintone;
performing time-to-frequency domain conversion on the digital signals;
detecting whether noise is present in the frequency domain conversion of the digital signals by determining whether amplitudes of a plurality of frequency bands of the digital signals are greater than or less than a threshold; and
selectively applying a filter to remove the noise from either the inbound maintone or the outbound maintone if noise was detected in the frequency domain conversion of the respective inbound maintone or outbound maintone.

26. A method in accordance with claim 25, further comprising passing the inbound maintone without noise filtering if a noise reduction has been already applied to the inbound maintone.

* * * * *